US011448115B2

(12) United States Patent
Seo et al.

(10) Patent No.: US 11,448,115 B2
(45) Date of Patent: Sep. 20, 2022

(54) CONSTRUCTION MACHINE

(71) Applicant: HITACHI CONSTRUCTION MACHINERY CO., LTD., Tokyo (JP)

(72) Inventors: Koji Seo, Tsuchiura (JP); Nobuhiro Ishii, Tsuchiura (JP); Kei Sato, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/979,347

(22) PCT Filed: Aug. 1, 2019

(86) PCT No.: PCT/JP2019/030127
§ 371 (c)(1),
(2) Date: Sep. 9, 2020

(87) PCT Pub. No.: WO2020/031818
PCT Pub. Date: Feb. 13, 2020

(65) Prior Publication Data
US 2021/0003062 A1  Jan. 7, 2021

(30) Foreign Application Priority Data
Aug. 6, 2018 (JP) .............................. JP2018-147826

(51) Int. Cl.
F01P 3/18    (2006.01)
F01P 5/06    (2006.01)
(Continued)

(52) U.S. Cl.
CPC .................. *F01P 3/18* (2013.01); *E02F 9/00* (2013.01); *E02F 9/0866* (2013.01); *F01P 3/20* (2013.01);
(Continued)

(58) Field of Classification Search
CPC ........ F01P 3/18; F01P 3/20; F01P 5/04; F01P 5/06; F01P 2003/182; F01P 2060/04; E02F 9/00; E02F 3/32; E02F 9/0866
See application file for complete search history.

(56) References Cited

U.S. PATENT DOCUMENTS 6,435,264 B1 * 8/2002 Konno ..................... F01P 3/18
165/41
2007/0007061 A1   1/2007 Meyer et al.
(Continued)

FOREIGN PATENT DOCUMENTS

CN      101748764 A    6/2010
JP      02-052926 U    4/1990
(Continued)

OTHER PUBLICATIONS

International Search Report of PCT/JP2019/030127 dated Dec. 21, 2019.
(Continued)

*Primary Examiner* — Jacob M Amick
(74) *Attorney, Agent, or Firm* — Mattingly & Malur, PC

(57) ABSTRACT

Two oil coolers (30, 32) are disposed so as to face each other in a front half of the inside of a heat exchanger chamber (26) defined in an upper revolving body (5), one oil cooler (31) is disposed in a rear half, and a space (E) formed between the oil coolers is used as work and passage spaces. Outside air as cooling air is allowed to pass through the respective oil coolers (30 to 32) by cooling fans (35), and cooling air that has passed through each of the two oil coolers (30, 32) disposed so as to face each other is made to mutually collide, and is discharged to the outside through a side outlet (38) of a front wall (26a) and a first upper outlet (39) of a ceiling (26e) of the heat exchanger chamber (26). Cooling air that has passed through the other one oil cooler (31) is made to
(Continued)

collide with a left side wall (26*c*), and is discharged to the outside through a second upper outlet (40) of the ceiling (26*e*).

5 Claims, 9 Drawing Sheets

(51) Int. Cl.
  *E02F 9/00* (2006.01)
  *F01P 3/20* (2006.01)
  *F01P 5/04* (2006.01)
  *E02F 9/08* (2006.01)
  *E02F 3/32* (2006.01)

(52) U.S. Cl.
  CPC ............... *F01P 5/04* (2013.01); *F01P 5/06* (2013.01); *E02F 3/32* (2013.01); *F01P 2003/182* (2013.01); *F01P 2060/04* (2013.01)

(56) References Cited

U.S. PATENT DOCUMENTS

| | | |
|---|---|---|
| 2010/0132347 A1 | 6/2010 | Ikeda et al. |
| 2013/0153180 A1* | 6/2013 | Montocchio ........... B60K 11/04 165/121 |
| 2017/0314453 A1 | 11/2017 | West et al. |

FOREIGN PATENT DOCUMENTS

| | | |
|---|---|---|
| JP | 11-269920 A | 10/1999 |
| JP | 2000274242 A | 10/2000 |
| JP | 2004-270570 A | 9/2004 |
| JP | 2009-155906 A | 7/2009 |
| JP | 2009-220811 A | 10/2009 |
| JP | 2015-058813 A | 3/2015 |

OTHER PUBLICATIONS

Chinese Office Action received in corresponding Chinese Application No. 201980017822.1 dated Nov. 22, 2021.
Extended European Search Report received in corresponding European Application No. 19846298.8 dated Apr. 22, 2022.

* cited by examiner

CONSTRUCTION MACHINE

TECHNICAL FIELD

The present invention relates to a construction machine mounted with an engine as a power source.

BACKGROUND ART

As this kind of a construction machine, for example, in a crane truck disclosed in Patent Document 1, a cab (driver's cab) is provided in a right front portion of a crane part installed at the center of a machine body, and an engine unit is mounted in a right rear portion of the crane part, that is, behind the cab.

When cooling air is taken in from a front side in order to cool the engine housed in an engine housing part of the engine unit, the cooling air is hindered by the cab located on the front side. Therefore, an air guiding port is provided in a rear end of the engine housing part, and a discharge port is provided in a heat radiating part of an upper front end of the engine housing part so as to be opened rearward. Consequently, cooling air can be taken into the engine housing part from the rear side through the air guiding port, and after the engine is cooled, the cooling air is returned to be discharged from the discharge port.

In the engine unit thus configured, since there is no room to house a DPF (Diesel Particulate Filter) for purification of exhaust of the engine in the engine housing part, a catalyst housing part is defined on an upper side of the engine housing part, and the DPF is housed in the catalyst housing part.

PRIOR ART DOCUMENT

Patent Document

Patent Document 1: Japanese Patent Laid-Open No. 2015-58813

SUMMARY OF THE INVENTION

Problems to be Solved by the Invention

However, in the crane truck disclosed in Patent Document 1, the DPF that is a heavy object is disposed at a high place, and therefore there is a problem that the position of the gravity center of the machine body is high, and stability is insufficient. Such a defect is not limited to a DPF of a crane truck, but is a problem common to heavy machinery mounted along with an engine in various construction machines.

For example, in a hydraulic excavator, an HST (Hydro Static Transmission) having an engine as a power source is mounted, and traveling motors, a revolving motor of an upper revolving body, cylinders of a working device (a boom, an arm, a bucket), and the like are driven by hydraulic oil discharged from a hydraulic pump of the HST by driving of the engine. In this kind of HST, cooling of hydraulic oil is extremely important, and oil temperature rise is a factor causing not only deterioration of hydraulic oil, but also malfunction due to sludge generation.

Therefore, an oil cooler (heat exchanger) for cooling hydraulic oil is mounted on the hydraulic excavator, and for example, in an extra large hydraulic excavator having an operating mass of 100 metric tons or more, a plurality of huge oil coolers are required in order to cool a large quantity of hydraulic oil. When hydraulic oil that circulates in an inner part is included, the oil coolers necessarily have considerable weight, and therefore it is desired that the gravity center of the machine body is disposed at a low position as low as possible like the aforementioned DPF.

In this kind of extra large hydraulic excavator, a heat exchanger chamber is defined adjacent to the engine of the HST mounted in the upper revolving body, and the oil coolers are housed in the heat exchange chamber. Each of the oil coolers is disposed along a side wall of the heat exchanger chamber, outside air as cooling air passes through each oil cooler through an inlet formed in the side wall, and thereafter is discharged to the outside through an outlet formed in a side wall or a ceiling of the heat exchanger chamber.

The oil coolers disposed as the same height as the engine and the like are preferable in lowering of the gravity center, but is restricted by the engine and the like adjacent to the area of the heat exchanger chamber, and therefore there is a circumstance that the heat exchanger chamber cannot be inherently expanded easily. Accordingly, although the oil coolers are disposed in the space limited heat exchanger chamber, this arrangement is not conventionally improper, and therefore a request for cooling performance and maintainability of the oil coolers cannot be satisfied.

First, in order to improve the cooling performance of the oil coolers, increase in size is effective. However, it is conventionally preferential that cooling air which has passed through each oil cooler is made to flow in the one direction, and is smoothly discharged to the outside. For example, a pair of oil coolers are disposed at a right angle along orthogonal two side walls of a heat exchanger chamber. Therefore, a dead space (lengthwise and crosswise dimensions are equivalent to the respective thicknesses of the oil cooler) forming a quadrangle in plan view is formed in a corner part of the two side walls, and increase in size of each oil cooler is hindered by the size of the dead space. Accordingly, arrangement of the oil coolers enabling prevention of the waste dead space is conventionally desired.

A worker enters the heat exchanger chamber, and performs maintenance work such as service and cleaning of the oil coolers from the inside by entering the heat exchanger chamber, or performs the maintenance work from the outside of the heat exchanger chamber. It is necessary to secure a work space inside the heat exchanger chamber in order to perform the maintenance work from the inside, and it is desired to secure a passage space inside the heat exchanger chamber so as to enable the worker to pass through the heat exchanger chamber in order to perform the maintenance work from the outside. For example, a pair of the aforementioned oil coolers disposed at the right angle along the two side walls interrupt the securing of the work space or the passage space, and therefore arrangement of the oil coolers enabling prevention of such a defect is desired.

The present invention has been made in order to solve such problems, and an object of the present invention is to provide a construction machine in which a plurality of heat exchangers are suitably disposed in a heat exchanger chamber defined in a machine body without formation of a dead space, so that improvement of cooling performance by increase in size of each heat exchanger can be attained, and a work space for maintenance of the heat exchangers, and a passage space for passing through are secured in the heat exchanger chamber, so that maintainability can be improved.

Means for Solving the Problems

In order to achieve the above object, a construction machine of the present invention includes: a heat exchanger chamber defined in a machine body; at least a pair of first heat exchangers that are disposed so as to face each other at a predetermined interval in the heat exchanger chamber, each of the first heat exchangers allowing outside air as cooling air to pass therethrough to be cooled, the outside air being introduced into the heat exchanger chamber from outside by a cooling fan; and a side outlet that is opened at a portion equivalent to a portion between both the first heat exchangers in a first side wall of the heat exchanger chamber, and that allows cooling air to discharge to lateral outside, the cooling air having passed through each of the first heat exchangers to mutually collide inside the heat exchanger chamber.

Advantageous Effects of the Invention

According to a construction machine of the present invention, a plurality of heat exchangers are suitably disposed in a heat exchanger chamber defined in a machine body without formation of a dead space, so that improvement of cooling performance by increase in size of each heat exchanger can be attained, and a work space for maintenance of the heat exchangers, and a passage space for passing through are secured in the heat exchanger chamber, so that maintainability can be improved.

MODE FOR CARRYING OUT THE INVENTION

Hereinafter, an embodiment obtained by embodying the present invention by an extra large hydraulic excavator that works at a mine or the like will be described.

Figure 1:
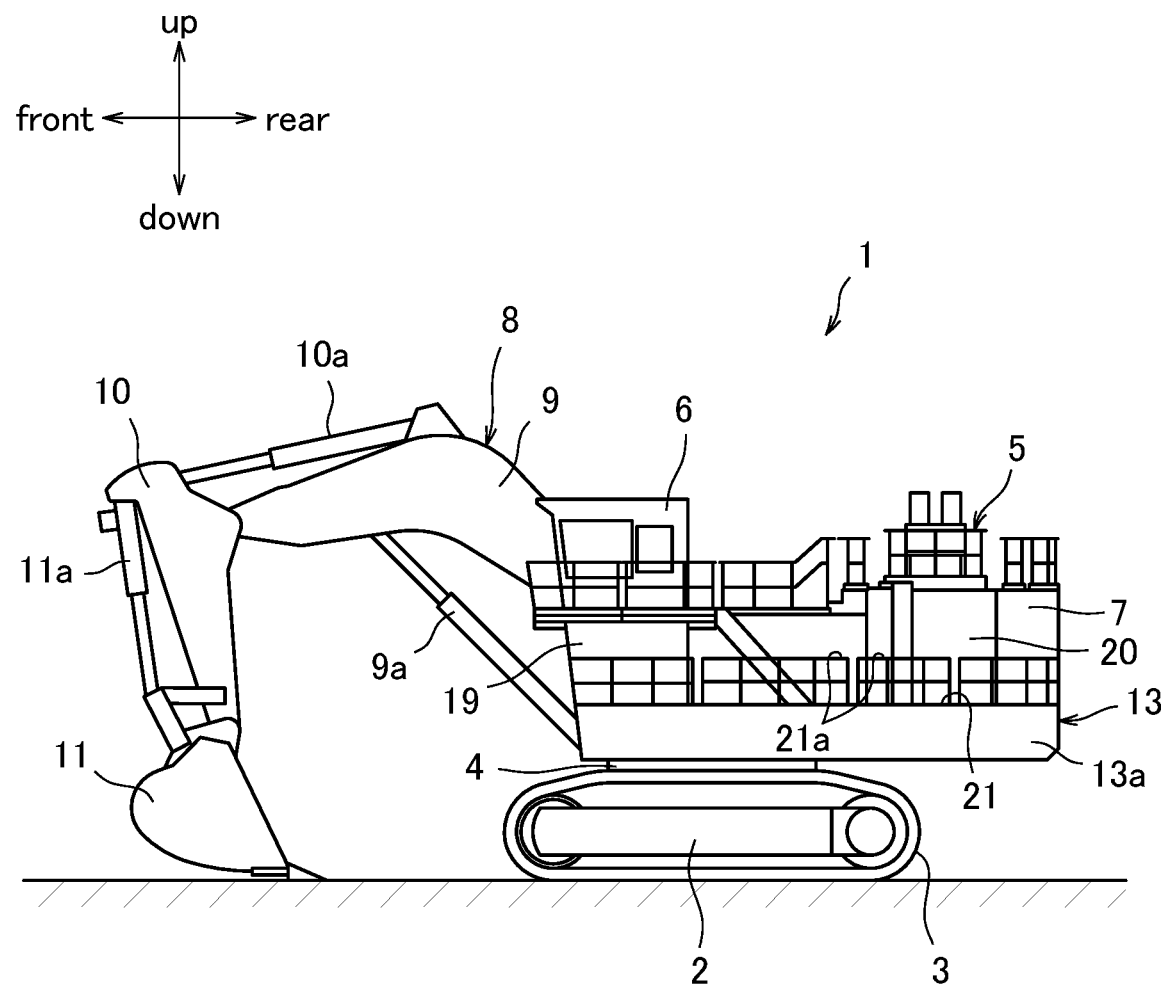
FIG. 1 is a side view illustrating a hydraulic excavator of an embodiment.

FIG. 1 is a side view illustrating a hydraulic excavator of this embodiment. In the following description, the front/rear, left/right and up/down directions are expressed with an operator getting on the hydraulic excavator as a main body.

A pair of crawlers 3 are provided in a lower traveling body 2 of a hydraulic excavator 1, and the crawlers 3 are respectively driven by hydraulic motors for traveling (not illustrated) to make the hydraulic excavator 1 travel. An upper revolving body 5 is provided on the lower traveling body 2 through a revolving device 4, and the upper revolving body 5 is revolved by driving of a hydraulic motor for revolving (not illustrated) of the revolving device 4. A cab 6 on which an operator gets is installed in front of the upper revolving body 5, and a counter weight 7 is fixed on a rear portion of the upper revolving body 5.

A working device 8 for excavation is mounted on the right side of the cab 6 of the upper revolving body 5 so as to be directed forward, and the working device 8 is composed of a boom 9, an arm 10, and a bucket 11. The angle of the boom 9 is changed by a boom cylinder 9a, the angle of the arm 10 is changed by an arm cylinder 10a, and the angle of the bucket 11 is changed by a bucket cylinder 11a.

Figure 2:
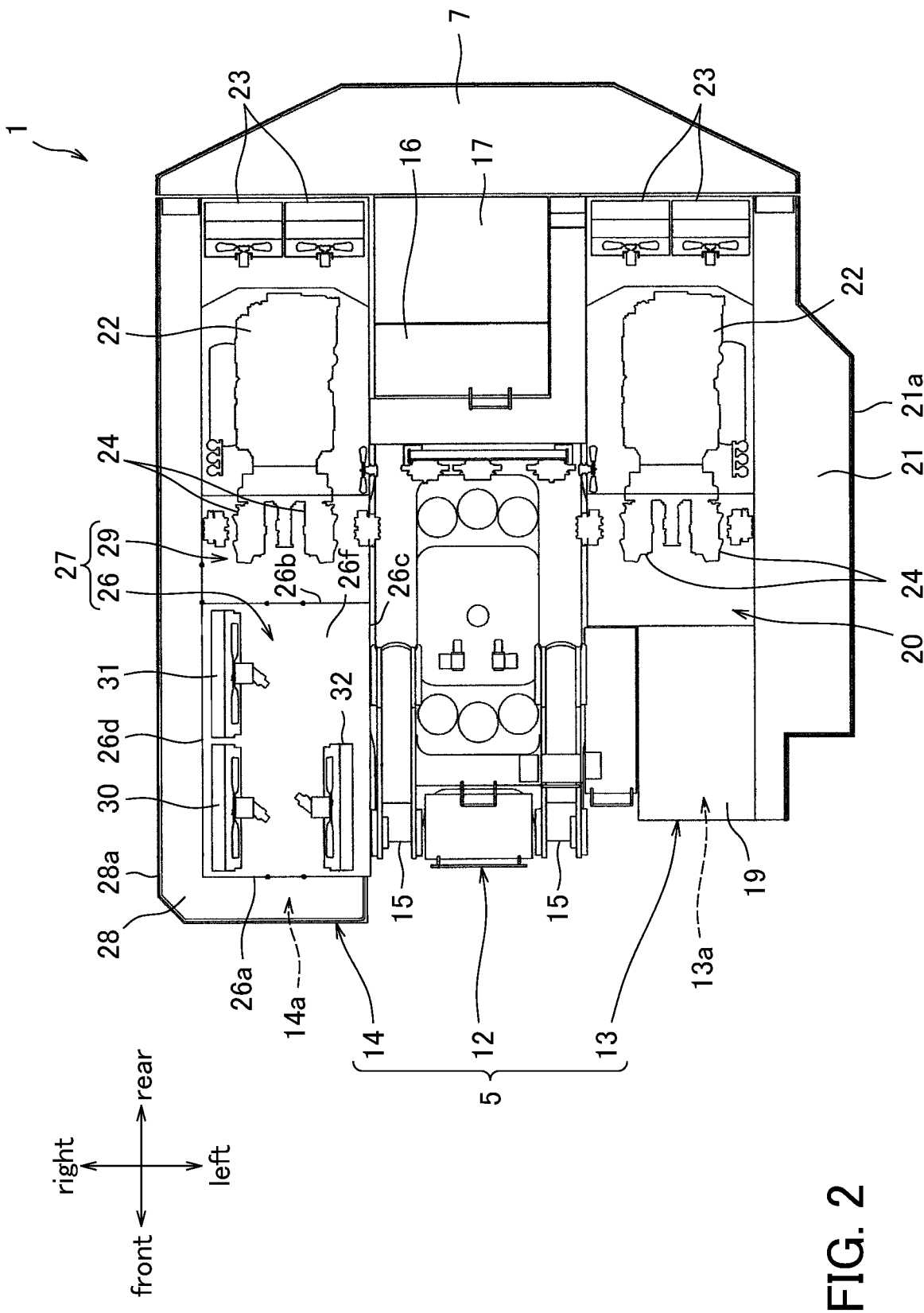
FIG. 2 is a plane sectional view illustrating details of an upper revolving body.

FIG. 2 is a plane sectional view illustrating details of the upper revolving body 5, and a configuration of the upper revolving body 5 will be described in more detail with reference to FIG. 2.

As a whole, the upper revolving body 5 is composed of a revolving frame 12 supported by the revolving device 4, a left engine unit 13 disposed on the left side of the revolving frame 12, and a right engine unit 14 disposed on the right side of the revolving frame 12. Unit bases 13a, 14a (shown in FIGS. 1 and 6) of the left and right engine units 13, 14 are connected to the revolving frame 12 by respective bolts (not illustrated), so that the upper revolving body 5 is constituted.

The revolving frame 12 forms a strong structure obtained by welding steel plates, and has a front portion provided with connecting parts 15, and a base end of the aforementioned boom 9 is connected such that the angle is changeable. A hydraulic oil tank 16 and a fuel tank 17 are installed on the revolving frame 12, and the aforementioned counter weight 7 is fixed to a rear portion of the revolving frame 12.

The unit base 13a of the left engine unit 13 forms a strong structure obtained by welding steel materials in a frame shape. A cab head 19 is provided on a front portion of the unit base 13a, and the cab 6 is installed on this cab head 19. A rectangular engine building 20 is constructed behind the cab 6, and a passage 21 including a handrail 21a for performing maintenance work is provided on the left side of the engine building 20, and the passage 21 is composed of a grating as purposes for slip prevention, deposition prevention of earth and sand, and the like.

An engine 22 that is a power source of an HST is vertically disposed and housed in the engine building 20, and various devices such as control valve composing the HST (not illustrated) are installed. Cooling units 23 each composed of a radiator and a cooling fan are provided in a rear portion of the engine building 20 so as to face the outside, and during operation of the engine 22, outside air as cooling air passes through the cooling units 23, and cooling water of the engine 22 is cooled.

A plurality of hydraulic pumps 24 of the HST are mounted on a front portion of the engine 22, and the hydraulic pumps 24 are driven by the engine 22, so that hydraulic oil stored in the hydraulic oil tank 16 is discharged. When various operation devices (not illustrated) installed in the cab 6 are operated by an operator, the hydraulic oil from the hydraulic pumps 24 is switched by the control valve in accordance with the operation, and appropriately supplied to the aforementioned hydraulic motors for traveling and for revolving, or various actuators of cylinders 9a to 11a and the like of the working device 8. Consequently, the hydraulic excavator 1 works.

The right engine unit 14 basically has a configuration similar to the configuration of the left engine unit 13, and a difference is that a heat exchanger chamber 26 is provided in place of the cab head 19, and therefore common portions are denoted by the same component numbers, description thereof will be omitted, and the difference will be intensively described.

A rectangular engine building 27 is constructed on the almost whole unit base 14a of the right engine unit 14, and a passage 28 including a handrail 28a for performing maintenance work is provided on the right side and the front side of the engine building 27.

The engine building 27 is sectioned into the front side and the rear side by a partition 26b, and the front side functions as the heat exchanger chamber 26, and the rear side functions as an engine chamber 29. When the heat exchanger chamber 26 is defined as a main body, the partition 26b is located on the rear side, and therefore the partition 26b is referred to as a rear wall 26b of the heat exchanger chamber 26 in the following description. The engine 22 of an HST, cooling units 23, and various devices are provided in the engine chamber 29, hydraulic oil discharged from hydraulic pumps 24 on a front portion of the engine 22 is appropriately supplied to various actuators in accordance with operation of an operator in a similar manner to the case of the aforementioned left engine unit 13.

In the heat exchanger chamber 26, three oil coolers 30 to 32 for cooling hydraulic oil of the HST are housed. Hydraulic oil that has been discharged from the hydraulic pumps 24 of the HST and that has driven the actuators passes through the inside of each of the oil coolers 30 to 32, is cooled by each of the oil coolers 30 to 32, and thereafter is returned to the hydraulic oil tank 16.

Figure 3:
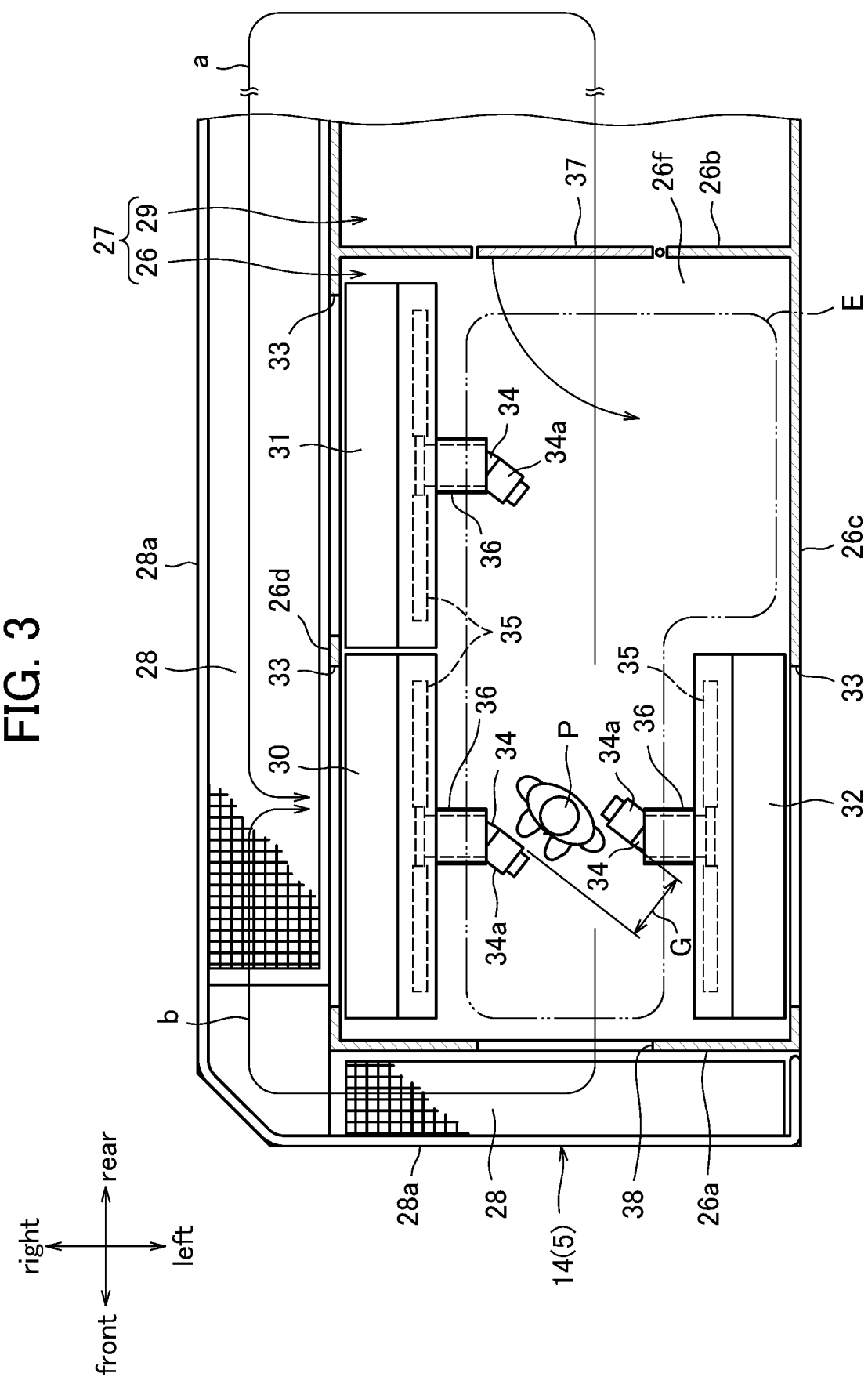
FIG. 3 is a plane sectional view of a heat exchanger chamber illustrating an arrangement state of oil coolers.
Figure 4:
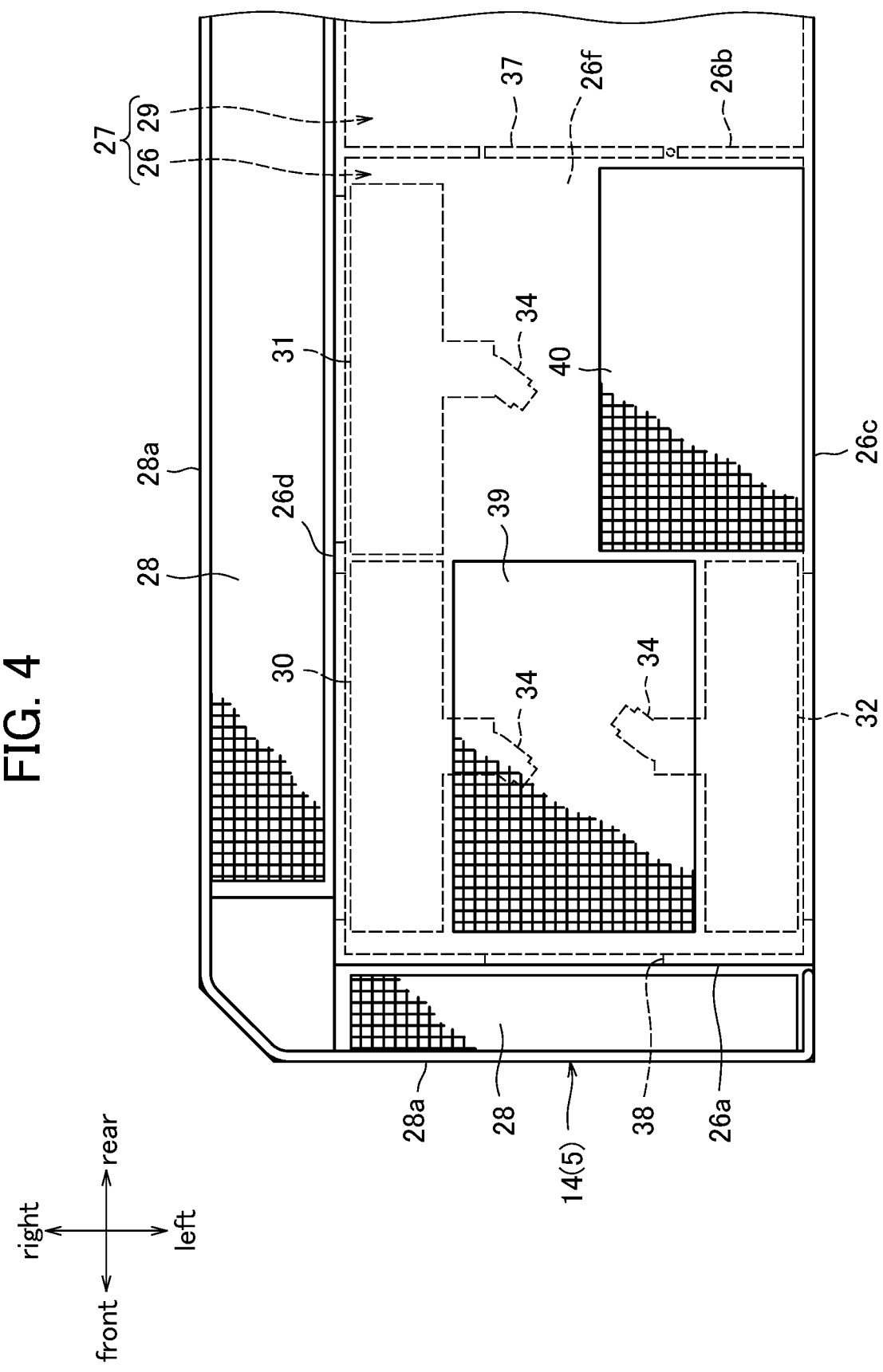
FIG. 4 is a plan view of the heat exchanger chamber illustrating a ceiling outlet.
Figure 5:
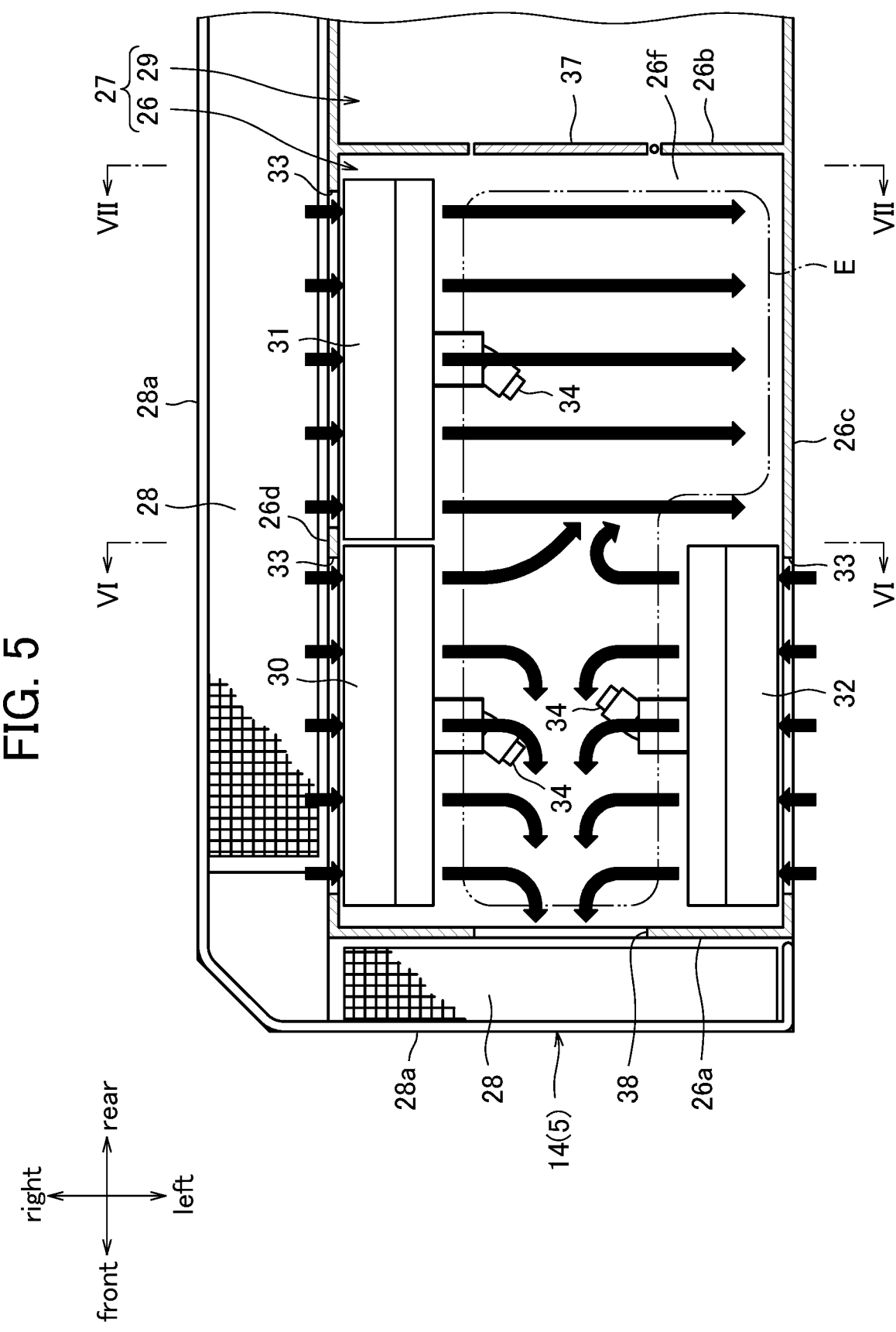
FIG. 5 is a plane sectional view corresponding to FIG. 3, illustrating the flow of cooling air in the heat exchanger chamber.
Figure 6:
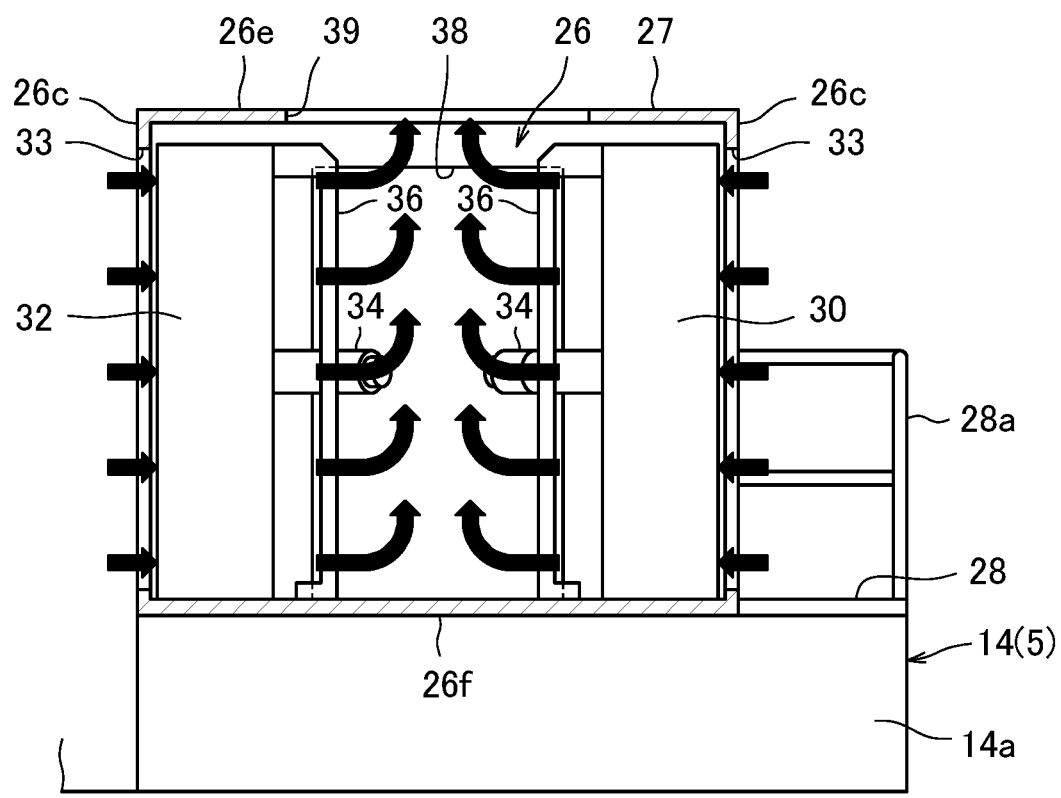
FIG. 6 is a VI-VI line sectional view of FIG. 5, illustrating the flow of the cooling air in the heat exchanger chamber.
Figure 7:
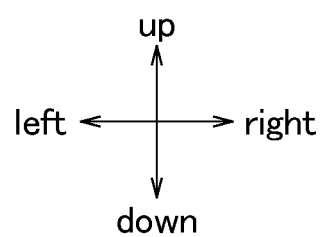
FIG. 7 is a VII-VII line sectional view of FIG. 5, illustrating the flow of the cooling air in the heat exchanger chamber.
Figure 7:
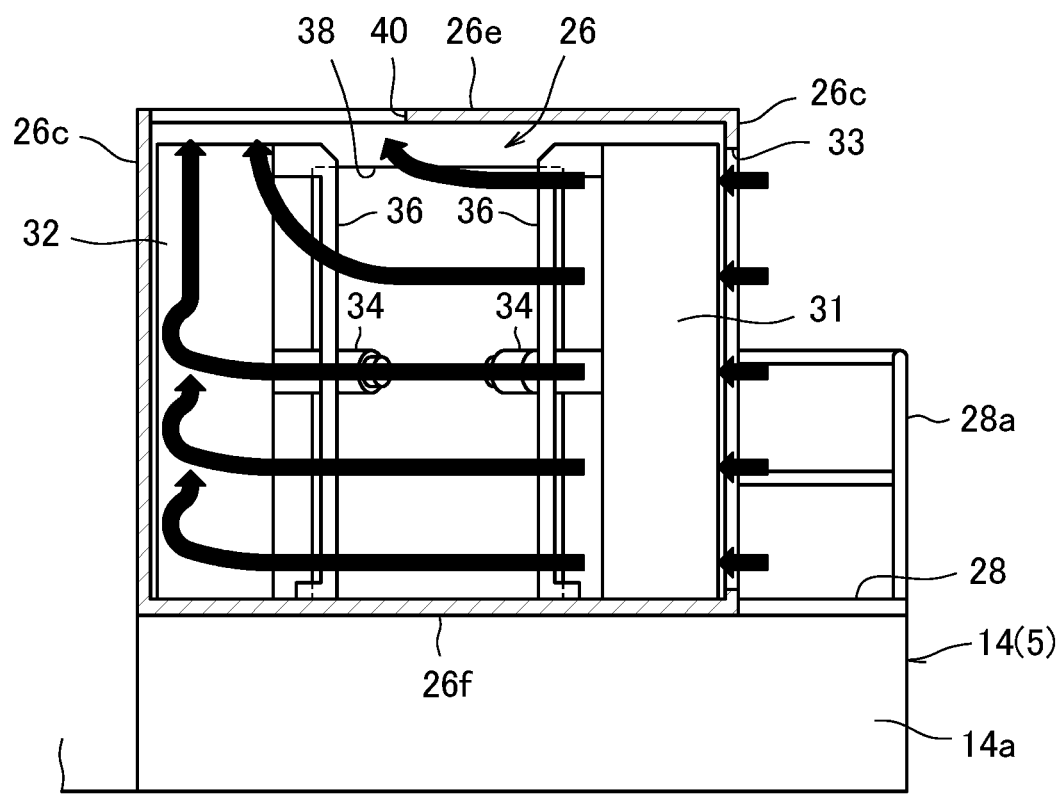
Figure 8:
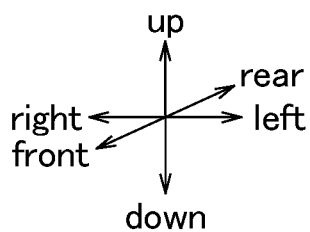
FIG. 8 is a perspective view of an engine building, as a worker who passes between cylinder blocks of hydraulic motors is viewed from a side outlet.
Figure 8:
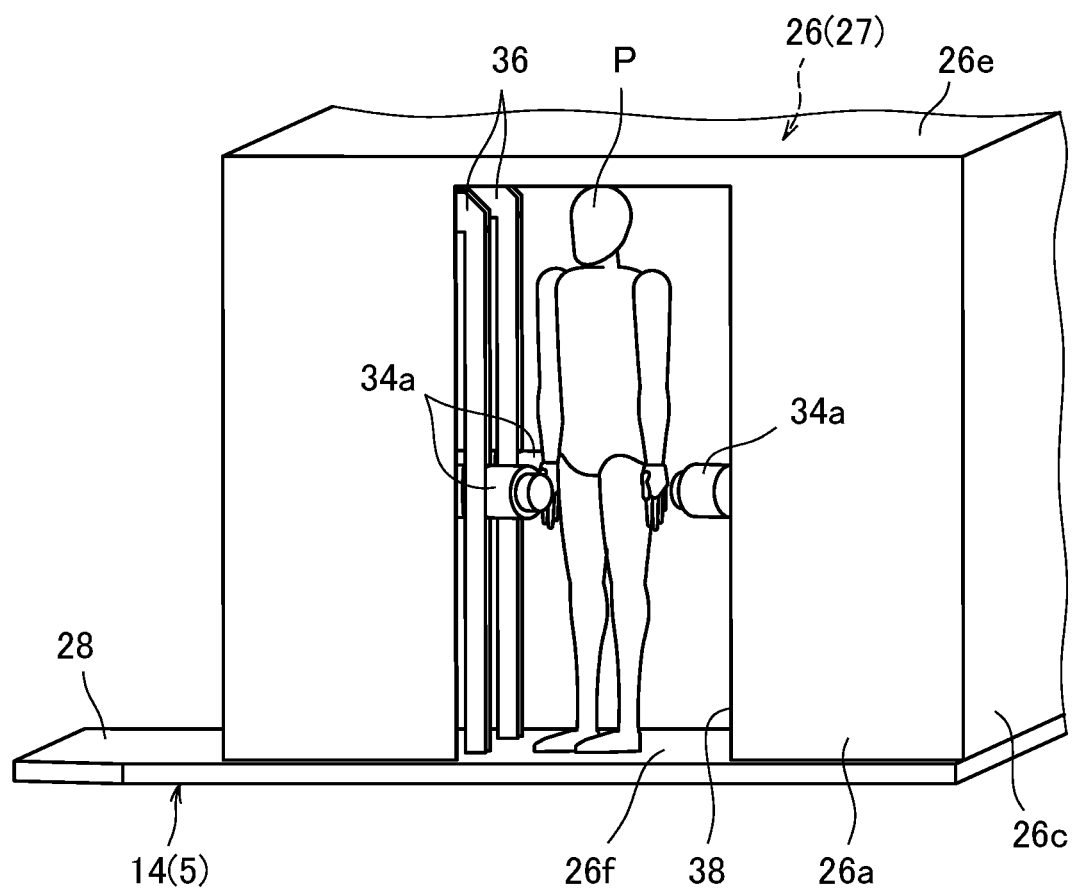

FIG. 3 is a plane sectional view of a heat exchanger chamber 26 illustrating an arrangement state of the oil coolers 30 to 32, FIG. 4 is a plan view of the heat exchanger chamber 26, illustrating a ceiling outlet, FIG. 5 is a plane sectional view corresponding to FIG. 3, illustrating the flow of cooling air in the heat exchanger chamber 26, FIG. 6 is a VI-VI line sectional view of FIG. 5, illustrating the flow of the cooling air in the heat exchanger chamber 26 similarly, and FIG. 7 is a VII-VII line sectional view of FIG. 5, illustrating the flow of the cooling air in the heat exchanger chamber 26 similarly, and FIG. 8 is a perspective view of the engine building 27 as a worker who passes between cylinder blocks of the hydraulic motor is viewed from a side outlet.

As particularly illustrated in FIGS. 3 and 6, the heat exchanger chamber 26 is defined by a front wall 26a (first side wall), the rear wall 26b, a left side wall 26c (second side wall), a right side wall 26d, a ceiling 26e and a floor surface 26f, and forms a rectangular shape elongated in the front-rear direction. The two oil coolers 30, 31 are disposed in the heat exchanger chamber 26 so as to be aligned on the front and the rear along the right side wall 26d, and the remaining one oil cooler 32 is disposed along a front portion of the left side wall 26c. Although not illustrated, each of the oil coolers 30 to 32 has an upper portion fixed to the ceiling 26e of the heat exchanger chamber 26, and a lower portion fixed to the floor surface 26f. However, the fixing structure can be arbitrarily changed.

The vertical lengths, the longitudinal lengths and the thicknesses (lateral lengths) of the three oil coolers 30 to 32 are set to be the same as each other. Additionally, the same hydraulic motors 34 and the same cooling fans 35 described below are employed. As a result, the specifications of the three oil coolers 30 to 32 are made common, and assembly work and the like are facilitated.

The vertical length of each of the oil coolers 30 to 32 is slightly shorter than the vertical length of the heat exchanger chamber 26, the longitudinal length is slightly shorter than ½ of the longitudinal length of the heat exchanger chamber 26, and the thickness (lateral length) is set much shorter than the lateral length of the heat exchanger chamber 26. Accordingly, an almost whole region of the right side wall 26d of the heat exchanger chamber 26 is covered with the oil coolers 30, 31, and an almost front half region of the left side wall 26c is covered with the oil cooler 32.

In the front half region of the heat exchanger chamber 26, the oil cooler 30 and the oil cooler 32 (both are equivalent to a first heat exchanger of the present invention) are disposed so as to face each other at a predetermined interval, and in a rear half region of the heat exchanger chamber 26, the oil cooler 31 (equivalent to a second heat exchanger of the present invention) are face the left side wall 26c at a predetermined interval.

In the left side wall 26c and the right side wall 26d, inlets 33 for outside air forming respective quadrangles corresponding to the oil coolers 30 to 32 are opened, and each of the inlets 33 is provided with a louver (not illustrated). As illustrated in FIGS. 3, 6 and 8, a bracket 36 vertically extends on an opposite surface side of each of the oil coolers 30 to 32 (in the heat exchanger chamber 26), has an upper end connected to each of the oil coolers 30 to 32, and a lower end fixed to the floor surface 26f. Inclined shaft type plunger hydraulic motors 34 (hereinafter simply referred so as a hydraulic motor) are supported through the brackets 36, and the respective cooling fans 35 (shown in FIG. 3) connected to output shafts face the oil coolers 30 to 32. In the oil coolers 30, 32 disposed so as to face each other, the rotation axes of the cooling fans 35 coincide with each other.

Upon receipt of supply of hydraulic oil from the hydraulic pumps 24, cooling fans 35 are rotationally driven by the hydraulic motors 34. Consequently, after outside air as cooling air passes through the oil coolers 30 to 32 through the inlets 33, and thereafter is introduced into the heat exchanger chamber 26. In place of a drawing type in which the cooling fans 35 are disposed on the downstream sides of the oil coolers 30 to 32, a pushing type in which the cooling fans 35 are disposed on the upstream sides may be employed.

By the aforementioned arrangement of the oil coolers 30 to 32, formation of a dead space in the heat exchanger chamber 26 is prevented. That is, when a pair of oil coolers are disposed along orthogonal two side walls of a heat exchanger chamber like a conventional technology described in [Problems to be solved by the Invention], a dead space is formed in a corner part of the two side walls, increase in size of the oil coolers is hindered. When the oil coolers 30, 32 are disposed so as to face each other, such formation of the dead space is prevented beforehand. Therefore, the size of each of the oil coolers 30 to 32 can be increased by the size of the dead space, and cooling performance can be improved.

Such arrangement of the oil coolers 30 to 32 greatly contributes to securing of a work space for maintenance of the oil coolers 30 to 32, and a passage space for coming and going of a worker. That is, a space E is formed between the oil coolers 30, 32 disposed so as to face each other, and between the oil cooler 31 and the left side wall 26c of the heat exchanger chamber 26, as illustrated by a two-dot chain line of FIG. 3, and therefore this space E is used as the work space, a worker can perform maintenance work of the oil coolers 30 to 32, for example, service, cleaning, or the like.

A door 37 is provided in the rear wall 26b of the heat exchanger chamber 26, and a side outlet 38 for discharging, to the outside, cooling air that has passed through the oil coolers 30, 32 is opened in the front wall 26a. Specifically, the side outlet 38 is opened at a portion equivalent to a portion between the oil cooler 30 and the oil cooler 32 in the front wall 26a, and enables a worker to pass therethrough like the door 37. Accordingly, as described above, the space E formed in the heat exchanger chamber 26 is used as the passage space, and enables free passing between the passage 28 on the front side of the heat exchanger chamber 26, and the engine chamber 29.

For example, in a case where a worker in the heat exchanger chamber 26 cleans from the outside of the oil cooler 30, when the worker cannot pass through the heat exchanger chamber 26, the worker needs to reach a destination point through the engine chamber 29, and the passage 28 on the right side, as illustrated by an arrow a in FIG. 3. In the case of this embodiment, as illustrated by the arrow b in FIG. 3, the worker can directly reach the destination point from the side outlet 38 by using the space E as the passage space, and therefore a moving route is remarkably shortened, and the maintenance work can be efficiently performed.

As described above, in this embodiment, the inside of the heat exchanger chamber 26 can be used as the work space for maintenance of the oil coolers 30 to 32, and the passage space for passing through, and therefore the maintainability can be significantly improved.

On the other hand, as is well known, each of the inclined shaft type plunger hydraulic motors 34 employs an operating principle in which a cylinder block 34a including a plurality of pistons is disposed to be inclined to the output shaft (coincides with the rotation axis of the cooling fan 35), the pressure of hydraulic oil sequentially acts on each piston, and rotating force is applied to the output shaft. Therefore, each cylinder block 34a protrudes from the bracket 36 toward the inside of the heat exchanger chamber 26 in a posture inclined to the output shaft.

As illustrated in FIGS. 3 and 8, the protruding cylinder blocks 34a of the hydraulic motors 34 of the oil coolers 30, 32 disposed so as to face each other face each other. However, in this embodiment, the inclination directions of the cylinder blocks 34a are set to be opposite to each other. Specifically, the cylinder block 34a on the left side is inclined diagonally rearward, and the cylinder block 34a on the left side is inclined diagonally forward. As a result, a gap G enabling passing through of a worker P is formed between the mutual cylinder blocks 34a. Consequently, formation of the passage space is attained.

In this kind of hydraulic excavator 1, a minimum width related to the passage space of a worker is regulated by an ISO standard, and the gap G satisfies this condition. For example, in a case where the cylinder blocks 34a are inclined in the same direction, the mutual hydraulic motors 34, and the oil coolers 30, 32 disposed so as to face each other need to be separated in order to form the same gap G, and the respective thicknesses of the oil coolers 30, 32 need to be reduced in the space limited heat exchanger chamber 26. The gap G satisfying the standard is secured by oppositely setting the inclination directions of the cylinder blocks 34a, and the respective thicknesses of the oil coolers 30, 32 are increased, so that cooling capacity can be further improved.

On the other hand, as illustrated in FIG. 4, outlets 39, 40 are opened in the ceiling 26e of the heat exchanger chamber 26. Specifically, the first upper outlet 39 is opened at a portion equivalent to a portion between the oil coolers 30, 32 in the ceiling 26e, the second upper outlet 40 is opened directly above the left side wall 26c facing the oil cooler 31 in the ceiling 26e, and a grating is disposed so as to enable cooling air to pass.

As apparent from the aforementioned description, the heat exchanger chamber 26 is defined adjacent to the front side of the engine chamber 29, and the oil coolers 30 to 32 in the heat exchanger chamber 26 are necessarily installed at the same level as the engine 22 in the engine chamber 29. Accordingly, for example, compared to the crane truck of Patent Document 1, in which the DPF is disposed at the high place directly above the engine, the gravity center of the hydraulic excavator 1 of this embodiment is remarkably lowered, and stable work can be performed even in a land that is rich in rise and fall such as a mine.

Now, the flow of cooling air that passes through the oil coolers 30 to 32 to produce a cooling effect will be described with reference to FIGS. 5 to 7.

The door 37 of the rear wall 26b is closed during work of the hydraulic excavator 1, outside air as cooling air passes through each of the oil coolers 30 to 32 by the cooling fan 35 rotationally driven by the hydraulic motor 34, and is introduced into the heat exchanger chamber 26. The cooling air that passes through each of the oil coolers 30, 32 disposed so as to face each other mutually collides, and a part of the cooing air changes a flow passage to a front side, and is discharged from the side outlet 38 to the outside on the front side. Another part of the cooling air changes the flow passage to an upper side, and is discharged from the first upper outlet 39 to the upper outside.

In a case where a pair of the oil coolers are disposed along the orthogonal two side walls of the heat exchanger chamber like the conventional technology described in [Problems to be solved by the Invention], cooling air that has passed flows in the one direction. In this embodiment, cooling air that has passed through each of the oil coolers 30, 32 disposed so as to face each other mutually collides, and does not flow in the one direction. At first glance, there is concern that such flow of the cooling air hinders smooth discharge to the outside.

However, even such flow of the cooling air does not cause any problem as far as sufficient opening areas of the outlets are secured. In this embodiment, the side outlet 38 having a large area is opened between the oil coolers 30, 32 in the front wall 26a, the first upper outlet 39 having a large area is opened between the oil coolers 30, 32 in the ceiling 26e, and therefore the cooling air that has passed through each of these outlets 38, 39 to mutually collide is smoothly discharged to the outside, and a slight part of the cooling air is further discharged also from the second upper outlet 40.

The cooling air that has passed through the oil cooler 31 collides with the left side wall 26c, and changes the flow passage upward, and is smoothly discharged to the upper outside through the second upper outlet 40 opened directly above the left side wall 26c and having a large area.

When discharge of the cooling air from the inside of the heat exchanger chamber 26 to the outside is stagnated, a quantity of the cooling air that passes through the oil coolers 30 to 32 is reduced, and therefore lowering of cooling performance is caused. In this embodiment, the opening areas of the outlets 38 to 40 are secured and sufficient cooling air passes through the oil coolers 30 to 32 as described above, and therefore cooling performance of the oil coolers 30 to 32 improved by increase in size can be maximized. As a result, it is possible to reliably prevent a trouble caused by oil temperature rise.

The specifications of the oil coolers 30 to 32 are made common, so that the cooling fans 35 of the oil coolers 30, 32 disposed so as to face each other are rotationally driven in the opposite directions in positional relation where the axes coincide with each other, and each cooling air generates a revolving flow in the opposite direction. Therefore, the cooling air not only collides from the right and the left, but also collides in the revolving direction with the axis as the center. Consequently, large turbulence of the cooling air caused by the above acts in the direction in which smooth discharge to the outside is hindered. In order to solve this point, a measure that a revolving flow in the same direction is generated in each cooling air is considered, and another example will be hereinafter described.

Figure 9:
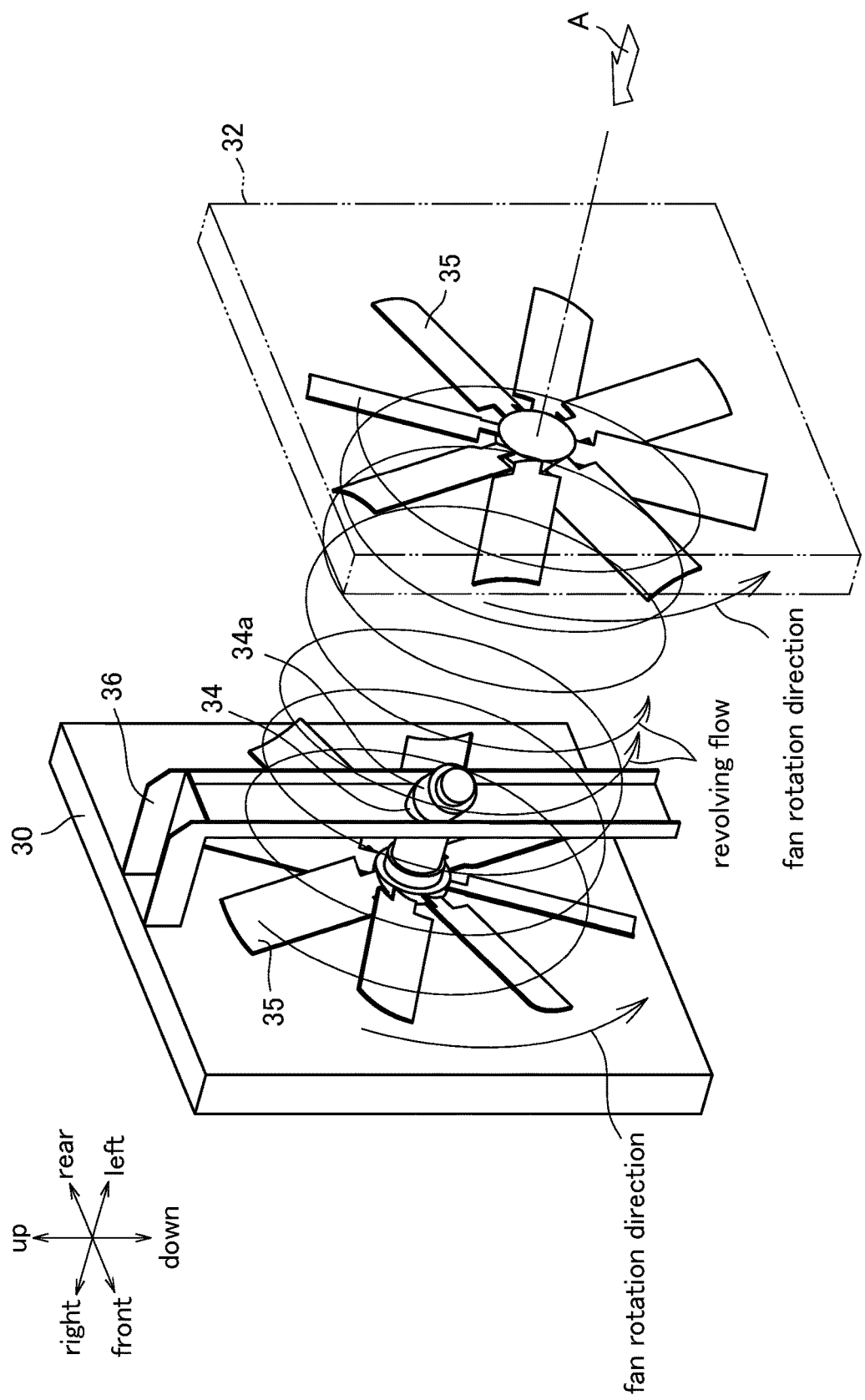
FIG. 9 is a perspective view illustrating another example in which the same directional revolving flow is generated in cooling air that has passed through each of the oil coolers disposed so as to face each other.

FIG. 9 is a perspective view illustrating another example in which the same directional revolving flow is generated in cooling air that has passed through each of oil coolers 30, 32 disposed so as to face each other.

In this another example, the cooling fans 35 are rotationally driven in the same direction by hydraulic motors 34 of the oil coolers 30, 32 disposed so as to face each other, and for example, in a case where the cooling fans 35 are viewed from an A arrow direction in FIG. 9, the cooling fans 35 are rotationally driven counterclockwise illustrated by arrows. Both the cooling fans 35 have fin shapes which are reciprocally set in the opposite inclinations, in order to introduce outside air into the heat exchanger chamber 26.

Accordingly, while the respective revolving flows in the same direction are generated by the cooling fans 35, and collide with each other from the left and the right, the revolving flows are brought into rather a joining state than a collision state in the revolving direction with an axis as the center. Therefore, the cooling air is smoothly discharged from each of outlets 38, 39 to the outside without generating any large turbulence, and the cooling performance of the oil coolers 30, 32 can be further improved compared to the aforementioned embodiment.

While the description of the embodiment is finished, an aspect of the present invention is not limited to this embodiment. For example, the extra large hydraulic excavator 1 is embodied in the aforementioned embodiment, but the present invention is not limited to this, and may be applied to, for example, a large-sized wheel loader as long as a large-sized construction machine housing a plurality of heat exchangers in the heat exchanger chamber 26 is used.

In the aforementioned embodiment, the three oil coolers 30 to 32 that cool hydraulic oil of the HST are housed as heat exchangers in the heat exchanger chamber 26. However, the heat exchangers to be applied are not limited to the above. For example, the present invention may be applied to radiators that cool engine cooling water, and the radiators may be housed in the heat exchanger chamber 26 in the same arrangement as the aforementioned embodiment.

The arrangement or the number of the oil coolers 30 to 32 may be changed. For example, in FIG. 3, the oil coolers 30, 32 may not be disposed so as to completely face each other, and disposed in positional relation of mutually shifting in the front-rear direction. The position of the oil cooler 32 on the left may be changed to the rear side, and disposed so as to face the respective half regions of the oil coolers 30, 31 on the right. The above arrangement is also included in the facing arrangement of the present invention. Furthermore, for example, in a case of two oil coolers, the two oil coolers may be disposed so as to face each other, and in a case of four oil coolers, two of the four oil coolers may be disposed so as to face other two oil coolers.

EXPLANATION OF REFERENCE SIGNS 1 hydraulic excavator (construction machine)
26 heat exchanger chamber
26a front wall (first side wall)
26c left side wall (second side wall)
26e ceiling
30, 32 oil cooler (first heat exchanger)
31 oil cooler (second heat exchanger)
34 inclined shaft type plunger hydraulic motor
34a cylinder block
35 cooling fan
38 side outlet
39 first upper outlet
40 second upper outlet
G gap

The invention claimed is:

1. A construction machine comprising:
a heat exchanger chamber defined in a machine body;
at least a pair of first heat exchangers that are disposed so as to face each other at a gap through which a worker is able to pass in the heat exchanger chamber, each of the first heat exchangers allowing outside air as cooling air to pass therethrough to be cooled, the outside air being introduced into the heat exchanger chamber from outside by a cooling fan; and
a side outlet that is opened at a portion equivalent to a portion between both the first heat exchangers in a first side wall of the heat exchanger chamber, and that allows cooling air to discharge to lateral outside, the cooling air having passed through each of the first heat exchangers to mutually collide inside the heat exchanger chamber.

2. The construction machine according to claim 1, further comprising
a first upper outlet that is opened at a portion equivalent to a portion between both the first heat exchangers in a ceiling of the heat exchanger chamber, and that allows the cooling air to discharge to upper outside, the cooling air having passed through each of the first heat exchangers to mutually collide inside the heat exchanger chamber.

3. The construction machine according to claim 2, further comprising:
a second heat exchanger aligned with any one of the first heat exchangers in the heat exchanger chamber; and
a second upper outlet that is opened at a portion equivalent to a portion directly above a second side wall facing the second heat exchanger in the ceiling of the heat exchanger chamber, and that allows cooling air to discharge to upper outside, the cooling air having passed through the second heat exchanger to collide with the second side wall.

4. The construction machine according to claim 1, wherein
the cooling fan of each of the first heat exchangers is rotationally driven by an inclined shaft type plunger hydraulic motor, and
cylinder blocks of the inclined shaft type plunger hydraulic motors each protrude in the heat exchanger chamber in a posture inclined to a rotating shaft, and mutual inclination directions of the cylinder blocks are set oppositely so as to form the gap through which a worker is able to pass.

5. The construction machine according to claim 1, wherein
the cooling fans of the first heat exchangers are rotationally driven in the same direction, and fin shapes are reciprocally set in opposite inclinations so as to enable outside air to be introduced into the heat exchanger.

* * * * *